(12) United States Patent
Weinberg et al.

(10) Patent No.: US 12,454,248 B2
(45) Date of Patent: Oct. 28, 2025

(54) METHODS FOR USING A SURFACE ACOUSTIC WAVE RESONATOR FOR AUTOMOBILE SECURITY

(71) Applicant: Analog Devices, Inc., Wilmington, MA (US)

(72) Inventors: Harvey Weinberg, Sharon, MA (US); Tze Lei Poo, Cambridge, MA (US); Tao Yu, Cambridge, MA (US); Eugene Oh Hwang, Sherman Oaks, CA (US)

(73) Assignee: Analog Devices, Inc., Wilmington, MA (US)

( * ) Notice: Subject to any disclaimer, the term of this patent is extended or adjusted under 35 U.S.C. 154(b) by 97 days.

(21) Appl. No.: 18/199,160

(22) Filed: May 18, 2023

(65) Prior Publication Data

US 2023/0286465 A1    Sep. 14, 2023

Related U.S. Application Data

(63) Continuation of application No. PCT/US2021/061424, filed on Dec. 1, 2021.

(60) Provisional application No. 63/120,700, filed on Dec. 2, 2020.

(51) Int. Cl.
*G08B 21/00* (2006.01)
*B60R 25/24* (2013.01)
*G06K 19/067* (2006.01)

(52) U.S. Cl.
CPC ........ *B60R 25/246* (2013.01); *G06K 19/0675* (2013.01); *B60R 2325/205* (2013.01)

(58) Field of Classification Search
CPC . B60R 25/246; B60R 2325/205; B60R 25/24; G06K 19/0675
USPC .......................................................... 340/5.61
See application file for complete search history.

(56) References Cited

U.S. PATENT DOCUMENTS

| | | | |
|---|---|---|---|
| 4,028,697 A | 6/1977 | Albanese et al. | |
| 5,517,115 A | 5/1996 | Prammer | |
| 5,983,084 A | 11/1999 | Lin | |
| 6,291,994 B1 | 9/2001 | Kim et al. | |
| 6,683,527 B1 | 1/2004 | Greenwood | |
| 6,760,579 B1 | 7/2004 | Yokoyama et al. | |
| 6,765,493 B2 | 7/2004 | Lonsdale et al. | |
| 7,023,323 B1 | 4/2006 | Nysen | |

(Continued)

FOREIGN PATENT DOCUMENTS

| | | |
|---|---|---|
| CA | 2127282 C | 5/2004 |
| CA | 2486551 C | 1/2012 |

(Continued)

OTHER PUBLICATIONS

International Search Report and Written Opinion mailed Feb. 23, 2022 in connection with International Application No. PCT/US2021/061424.

(Continued)

*Primary Examiner* — Mark S Rushing
(74) *Attorney, Agent, or Firm* — DLA Piper LLP (US)

(57) ABSTRACT

Remote keyless entry (RKE) systems and devices are described. The RKE devices include one or more passive radios that respond to an interrogation signal from an interrogating device such as a vehicle. The passive radio sends a responsive signal that can include a decaying portion representing a ringdown signal. The passive radio includes a SAW resonator in some situations.

20 Claims, 12 Drawing Sheets

(56) References Cited

U.S. PATENT DOCUMENTS

| | | | |
|---|---|---|---|
| 7,065,459 | B2 | 6/2006 | Kalinin et al. |
| 7,099,367 | B2 | 8/2006 | Richards et al. |
| 7,352,468 | B2 | 4/2008 | Tarsa |
| 7,394,251 | B2 | 7/2008 | Lin |
| 7,463,135 | B2 | 12/2008 | DiCroce |
| 7,786,864 | B1 | 8/2010 | Shostak et al. |
| 8,102,952 | B2 | 1/2012 | Sung et al. |
| 8,134,990 | B2 | 3/2012 | Kangas et al. |
| 8,143,890 | B2 | 3/2012 | Dong et al. |
| 8,232,799 | B2 | 7/2012 | Hajian et al. |
| 8,296,087 | B2 | 10/2012 | Kalinin et al. |
| 8,335,598 | B2 | 12/2012 | Dickerhoof et al. |
| 8,436,512 | B2 | 5/2013 | Droit et al. |
| 8,490,489 | B2 | 7/2013 | Randall et al. |
| 8,704,522 | B2 | 4/2014 | Akita et al. |
| 8,737,911 | B2 | 5/2014 | Black et al. |
| 9,008,216 | B2 | 4/2015 | Garmany |
| 9,574,966 | B2 | 2/2017 | Huang et al. |
| 9,593,521 | B2 | 3/2017 | Breed |
| 10,075,961 | B2 | 9/2018 | Nekovee |
| 10,418,965 | B2 | 9/2019 | Feng et al. |
| 2001/0043650 | A1 | 11/2001 | Sommer et al. |
| 2002/0064246 | A1 | 5/2002 | Kelkar et al. |
| 2002/0181633 | A1 | 12/2002 | Trans |
| 2004/0127184 | A1 | 7/2004 | Kao |
| 2007/0058703 | A1 | 3/2007 | Behzad et al. |
| 2007/0096940 | A1 | 5/2007 | Laranang et al. |
| 2007/0107519 | A1 | 5/2007 | Liu et al. |
| 2007/0126561 | A1* | 6/2007 | Breed .................. B60R 25/2081 340/426.13 |
| 2008/0112265 | A1 | 5/2008 | Urbano et al. |
| 2008/0180248 | A1* | 7/2008 | Lian ................... G08B 13/2414 340/572.1 |
| 2009/0153319 | A1 | 6/2009 | Duran et al. |
| 2009/0224629 | A1 | 9/2009 | Jinno et al. |
| 2010/0052865 | A1 | 3/2010 | Eckstein |
| 2010/0095740 | A1 | 4/2010 | Walton et al. |
| 2010/0127834 | A1 | 5/2010 | Cobianu et al. |
| 2012/0086567 | A1 | 4/2012 | Namizaki et al. |
| 2015/0230105 | A1 | 8/2015 | Negus et al. |
| 2015/0312654 | A1 | 10/2015 | Lee et al. |
| 2017/0282856 | A1* | 10/2017 | Riedel ..................... B60R 25/24 |
| 2017/0331460 | A1 | 11/2017 | Rokhsaz et al. |
| 2018/0017652 | A1 | 1/2018 | Ye |
| 2018/0069576 | A1 | 3/2018 | Dark et al. |
| 2018/0215347 | A1* | 8/2018 | Weghaus ................ B60R 25/24 |
| 2020/0007540 | A1 | 1/2020 | Kawaguchi et al. |
| 2020/0309941 | A1* | 10/2020 | Makari ................. G01S 5/0218 |
| 2020/0314607 | A1 | 10/2020 | Hwang et al. |

FOREIGN PATENT DOCUMENTS

| | | |
|---|---|---|
| CN | 201321015 Y | 10/2009 |
| CN | 204002031 U | 12/2014 |
| CN | 104316761 A | 1/2015 |
| CN | 109787930 A | 5/2019 |
| DE | 10 2015 106589 A1 | 10/2015 |
| EP | 1 196 863 A1 | 4/2002 |
| EP | 3 025 466 B1 | 1/2019 |
| GB | 2 411 239 A | 8/2005 |
| JP | 2003-239590 A | 8/2003 |
| JP | 2006-118220 A | 5/2006 |
| JP | 2008-263627 A | 10/2008 |
| JP | 2010-063062 A | 3/2010 |
| JP | 2012-074824 A | 4/2012 |
| JP | 2019-518202 A | 6/2019 |
| KR | 20010090039 A | 10/2001 |
| KR | 20100052263 A | 5/2010 |
| KR | 10-1959938 B1 | 3/2019 |
| WO | WO 01/02993 A1 | 1/2001 |
| WO | WO 2008/037547 A2 | 4/2008 |
| WO | WO 2016/119686 A2 | 8/2016 |
| WO | WO 2017/180698 A1 | 10/2017 |

OTHER PUBLICATIONS

[No Author Listed], Path Loss in Remote Keyless Entry Systems. Analog Devices. Maxim Integrated Application Note 3945. Dec. 15, 2006; 6 pages.

[No Author Listed], Requirements of Remote Keyless Entry (RKE) Systems. Analog Devices. Maxim Integrated Application Note 3395. Feb. 16, 2005. 7 pages.

[No Author Listed], Resonators at Pav. SAW Filters Pav Resonators. https://simka66.rn/en/. last updated Nov. 3, 2020. 20 pages.

Ali et al., Exploiting Spatial Proximity for Detection in Wireless Sensor Network. Iranian Journal of Science and Technology, Transactions of Electrical Engineering. Sep. 10, 2019; 12 pages.

Francillon et al., Relay Attacks on Passive Keyless Entry and Start Systems in Modern Cars. Department of Computer Science ETH Zurich. 2010; 15 pages.

Glas et al., SAW Resonators for RF Keyless Entry Applications. Microwave Journal, May 5, 1997;40(5):3 pages.

Lurz et al., Reader Architectures for Wireless Surface Acoustic Waves Sensors. Sensors. 2018; 18(1734): 29 pages.

Pohl et al., Wireless Sensing Using Oscillator Circuits Locked to Remote High-6 SAW Resonators. IEEE Transactions on Ultrasonics, Ferroelectrics, and Frequency Control. Sep. 1998;45(5):1161-8.

Reindl et al., Theory and Application on Passive SAW Radio Transponders as Sensors. IEEE Transactions on Ultrasonics, Ferroelectrics. And Frequency Control. Sep. 1998:45(5):1281-1292.

Roy et al., RF Performance Optimization of a Saw Based Transmitter for Remote Keyless Entry System. Motorola Automotive and Industrial Electronics Group. IEEE Ultrasonics Symposium, 1994;1:169-73.

* cited by examiner

METHODS FOR USING A SURFACE ACOUSTIC WAVE RESONATOR FOR AUTOMOBILE SECURITY

CROSS-REFERENCE TO RELATED APPLICATIONS

This application is a Continuation of International Patent Application Ser. No. PCT/US2021/061424, filed Dec. 1, 2021, and entitled "METHODS FOR USING A SURFACE ACOUSTIC WAVE RESONATOR FOR AUTOMOBILE SECURITY," which is hereby incorporated herein by reference in its entirety.

International Patent Application Ser. No. PCT/US2021/061424 claims the benefit under 35 U.S.C. § 119(e) of U.S. Provisional Patent Application Ser. No. 63/120,700, filed Dec. 2, 2020, and entitled "METHODS FOR USING A SURFACE ACOUSTIC WAVE RESONATOR FOR AUTOMOBILE SECURITY," which is hereby incorporated herein by reference in its entirety.

BACKGROUND

Remote keyless entry (RKE) systems are used to unlock cars. Sometimes, such systems are used to start the car as well. The systems include a key fob having a battery-powered radio to communicate wirelessly with the car.

BRIEF SUMMARY

According to some embodiments, a remote keyless entry apparatus is provided. The remote keyless entry apparatus comprises a housing, an active radio disposed within the housing and comprising powered circuitry configured to receive signals from and send signals to a vehicle, and a passive radio disposed within the housing and comprising passive circuitry, the passive radio configured to transmit a resonating ringdown signal to the vehicle in response to receiving an interrogation pulse from the vehicle.

According to some embodiments, a method of operating a remote keyless entry apparatus having a housing, an active radio disposed within the housing, and a passive radio disposed within the housing is provided. The method comprises receiving, with the passive radio, an interrogation pulse from a vehicle, and transmitting to the vehicle, using the passive radio and in response to receiving the interrogation pulse, a resonating ringdown signal.

According to some embodiments, a method of operating a vehicle transceiver is provided. The method comprises transmitting, with transmitter circuitry of the vehicle transceiver, an interrogation signal, receiving, after transmitting the interrogation signal and using receiver circuitry of the vehicle transceiver, a ringdown response signal, and processing the ringdown response signal to confirm authenticity of the ringdown response signal.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
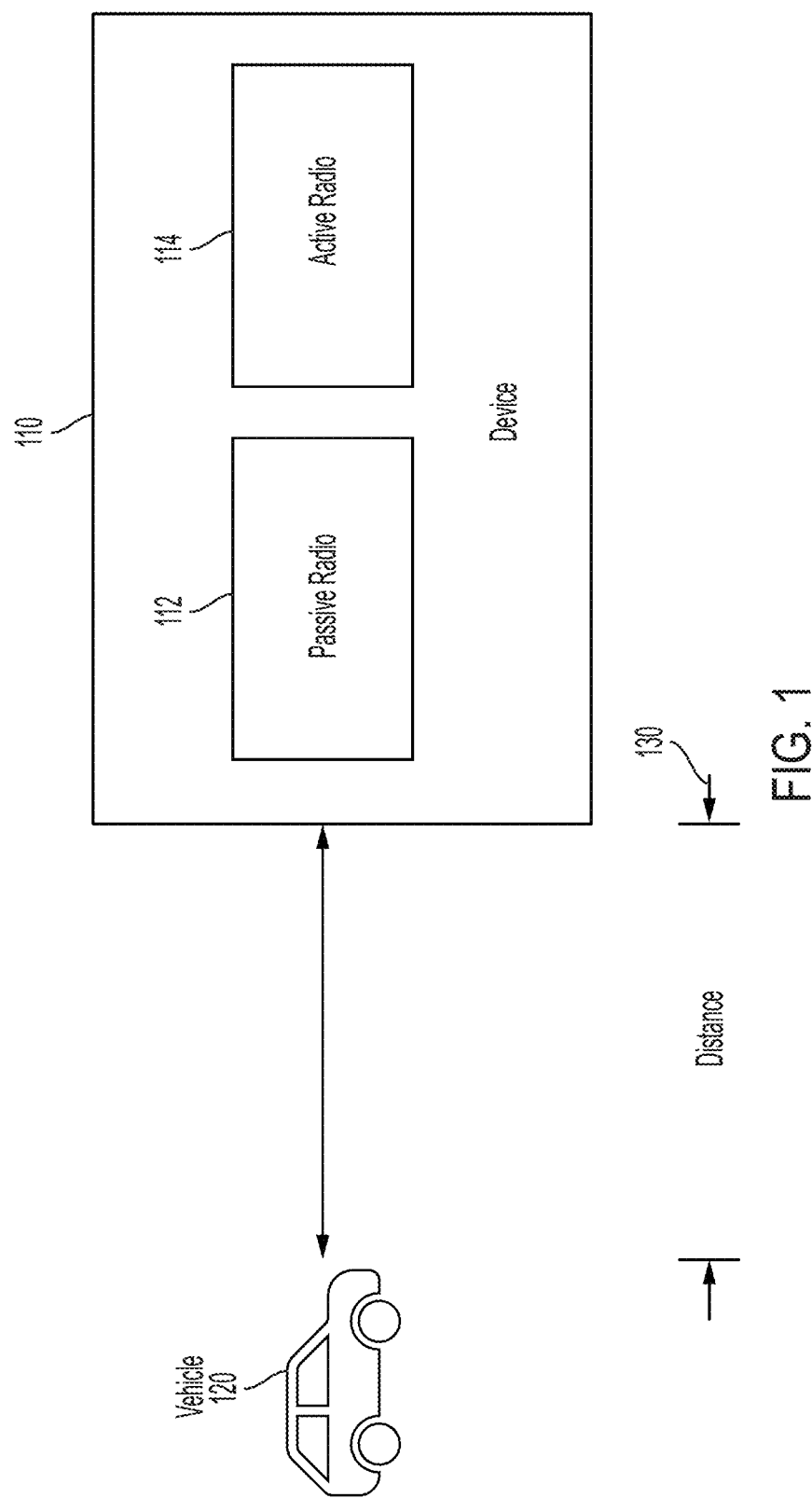
FIG. 1 illustrates a remote keyless entry (RKE) system according to a non-limiting embodiment of the present application.

Aspects of the present application are directed to remote keyless entry (RKE) systems that utilize a passive radio. The passive radio may be included in a key fob or other remote entry device. Applicants have recognized that RKE systems are subject to various types of attacks, including relay attacks in which a man-in-the-middle relays signals between a key fob and a car without viewing or manipulating the signal, and that use of a passive radio with a distinctive response may provide enhanced security against these and other types of attacks. By utilizing a passive radio, security may be enhanced since operation of the passive radio may require being activated by a very specific interrogation signal, which may be difficult for an attacker to know or determine. For instance, the passive radio may exhibit a high quality factor (Q), making it difficult for an attacker to identify the correct interrogation frequency. Also, by utilizing a passive radio with a distinctive response, security may be enhanced because the distinctive response may be difficult for an attacker to replicate. Also, power consumption of the RKE system may be less than if an active radio were used.

In some embodiments, the passive radio includes a surface acoustic wave (SAW) resonator characterized by a distinctive resonance response when prompted to resonate by an interrogation signal. SAW resonators may be characterized by a high Q, meaning a narrow resonance peak. As a result, successful interrogation of the SAW resonator will require, in at least some embodiments, a precise interrogation signal, for instance having a precise frequency aligned with the resonance frequency of the SAW resonator. An attacker may have a difficult time knowing or determining the resonance frequency of the SAW resonator for any given RKE system, thus making it less likely and even impractical to successfully launch a relay attack on the RKE system. Moreover, in some embodiments, the interrogation signal may be obfuscated, which may further enhance security by rendering the communication less susceptible to attack.

According to an aspect of the present application, the passive radio, whether comprising a SAW resonator or other form of passive radio, is configured to communicate over distances up to and greater than tens of centimeters. The passive radio is not a near-field communication device or RFID device. As explained above, in some embodiments, the passive radio includes a SAW resonator.

According to an aspect of the present application, a RKE device includes one or more passive radios to perform multiple functions of the RKE device. The multiple functions may include accessing or gaining entry to a vehicle (e.g., locking and/or unlocking the vehicle) and starting the vehicle. Those two functions may be differentiated by different passive radio responses. That is, a first passive radio response may initiate locking/unlocking of the vehicle and a second passive radio response may initiate ignition of the vehicle. The different responses may differ in signal frequency, as one example. In some embodiments, the RKE device includes multiple passive radios, with the different passive radios performing the different functions of the RKE device. For example, a first passive radio characterized by a first resonance frequency may control accessing (e.g., locking and/or unlocking) of the vehicle and a second passive radio characterized by a second resonance frequency different than the first resonance frequency may control ignition of the vehicle. The passive radios may comprise respective SAW resonators. In other embodiments, a single passive radio with a programmable frequency may be used to perform the multiple functions. For example, a passive radio may comprise a SAW resonator with a programmable resonance frequency. The resonance frequency may be programmed to a first value to control accessing (e.g., locking and/or unlocking) of the vehicle and to a second value to control ignition of the vehicle.

According to an aspect of the present application, RKE devices including one or more passive radios may also include an active radio. In some embodiments, both the active radio and passive radio may be used in combination to gain entry to a vehicle and/or to start the vehicle. For example, an active radio may be used to conduct a digital challenge-response operation. If successful, the passive radio may then be used for a further challenge-response operation. In some embodiments, only upon successful completion of both challenge-response operations will the vehicle be opened and/or started.

The aspects and embodiments described above, as well as additional aspects and embodiments, are described further below. These aspects and/or embodiments may be used individually, all together, or in any combination of two or more, as the application is not limited in this respect.

As described above, aspects of the present application provide an RKE system which includes and utilizes a passive radio to control access to a vehicle and/or ignition of the vehicle. The passive radio may be included in a portable RKE device, such as a key fob or smartphone. The passive radio may issue a distinctive response signal in response to being interrogated with an appropriate interrogation signal. The distinctive response signal may verify the identity of the RKE device, and thus serve to authorize access to the vehicle and/or ignition of the vehicle.

FIG. 1 illustrates an example of a remote keyless entry (RKE) system 100 including RKE device 110 and a vehicle 120. The vehicle 120 may be any type of vehicle (e.g., car, tractor, bus, etc.). The vehicle 120 may be a distance 130 away from the RKE device 110. It should be appreciated that aspects of the present application also apply to systems that include a device other than a vehicle, including any device to which access is desired and/or for which ignition is desired. That is, the vehicle 120 may be replaced in some embodiments by a different type of device.

The RKE device 110 includes a passive radio 112 and may optionally include active radio 114. Although FIG. 1 illustrates a single passive radio 112, according to some embodiments, an RKE device includes more than one passive radio.

The RKE device 110 may take various form factors. In some embodiments, the RKE device 110 may be a key fob or smartphone or may be included as a part of a key fob or smartphone. In some examples, the RKE device may be portable and/or handheld. For example, the RKE device 110 may be a key fob having a housing, such as a plastic shell, and may be sized to be portable. For example, the RKE device 110 may be a key fob of a size less than 4 inches by 3 inches by 1 inch, and with a weight ranging from between 50-150 grams as a non-limiting example. The RKE device 110 may be a smartphone of dimensions ranging from a length between 4-7 inches, a width between 2-4 inches, and a thickness between 0.2-0.5 inches as a non-limiting example, and may have a weight ranging between 50 grams to 300 grams as a non-limiting example.

The passive radio 112 may be selected to exhibit a distinctive response signal in response to a suitable interrogation signal and may be selected to be activatable by a specific interrogation signal that is not easily determined by an entity lacking knowledge of the exact nature of the interrogation signal. For instance, the passive radio 112 may be configured to exhibit a high Q, and thus a narrow resonance frequency peak. According to some embodiments, the Q may be of a value of 500 or above. In some examples, the Q may be of a value 1000 or above. In some embodiments, Q may be between 700 and 1,500, including any value or range of values within that range. According to some embodiments, the width of the resonant frequency peak may be 3 megahertz (MHz) or less, including any value within that range. The passive radio may operate within a 2.4 gigahertz (GHz) band range (e.g., 2.4 GHz to 2.5 GHz). For example, one or more passive radios may use 20-40 channels of the 2.4 GHz band. In some examples, the radio may operate within a 5 GHz band. Other frequencies are possible.

According to some embodiments, one or more of the frequencies of the interrogation signal may be randomized. For example, the vehicle may be additionally configured to send multiple randomized frequencies to passive radio 112. The passive radio may be configured to respond to only one specific frequency of the multiple response frequencies of the interrogation signal. In some examples, the passive radio may be configured to respond to a subset of frequencies of the multiple frequencies, for example, within a suitable range. When transmitting a challenge or interrogation signal, the vehicle may randomly select one of the multiple frequencies.

In this manner, successful interrogation of the passive radio may require knowledge of the precise resonance frequency of the passive radio, which in turn may increase the difficulty of a successful attack by a third party.

The passive radio 112 can take various forms. In some embodiments, the passive radio 112 may include a SAW resonator. Examples are described below in connection with FIG. 2B, FIG. 6A, and FIG. 6B. In some embodiments, the passive radio may be implemented by RLC components. Examples are described below in connection with FIGS. 2A and 2B.

The active radio 114 may be used to communicate with the vehicle by transmitting and receiving signals to and from the vehicle. For example, a handshake protocol may be performed by the active radio 114 and the vehicle to authenticate the vehicle, the device, and/or both. The active radio may be powered by a battery, or other power source, and may actively generate a signal for transmission using suitable active circuitry.

The distance 130 may be a distance suitable for operation as an RKE system. For example, the distance 130 may be several meters when a user is away from the vehicle, and may be several centimeters when the user is within the car and trying to start it. Thus, the distance 130 is variable.

Figure 7:
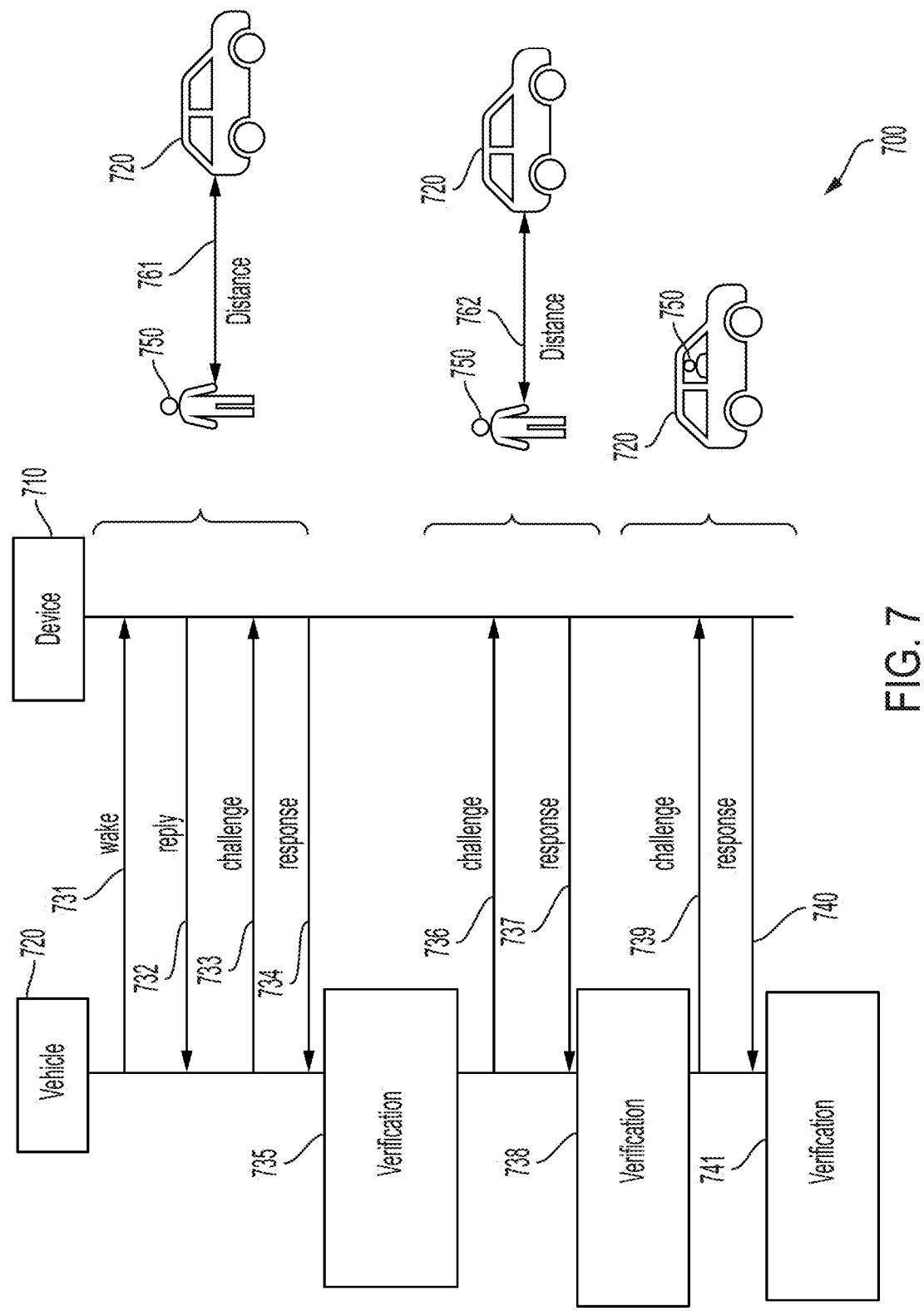
FIG. 7 is an illustration of communication between a device and vehicle according to a non-limiting embodiment of the present application.
Figure 8:
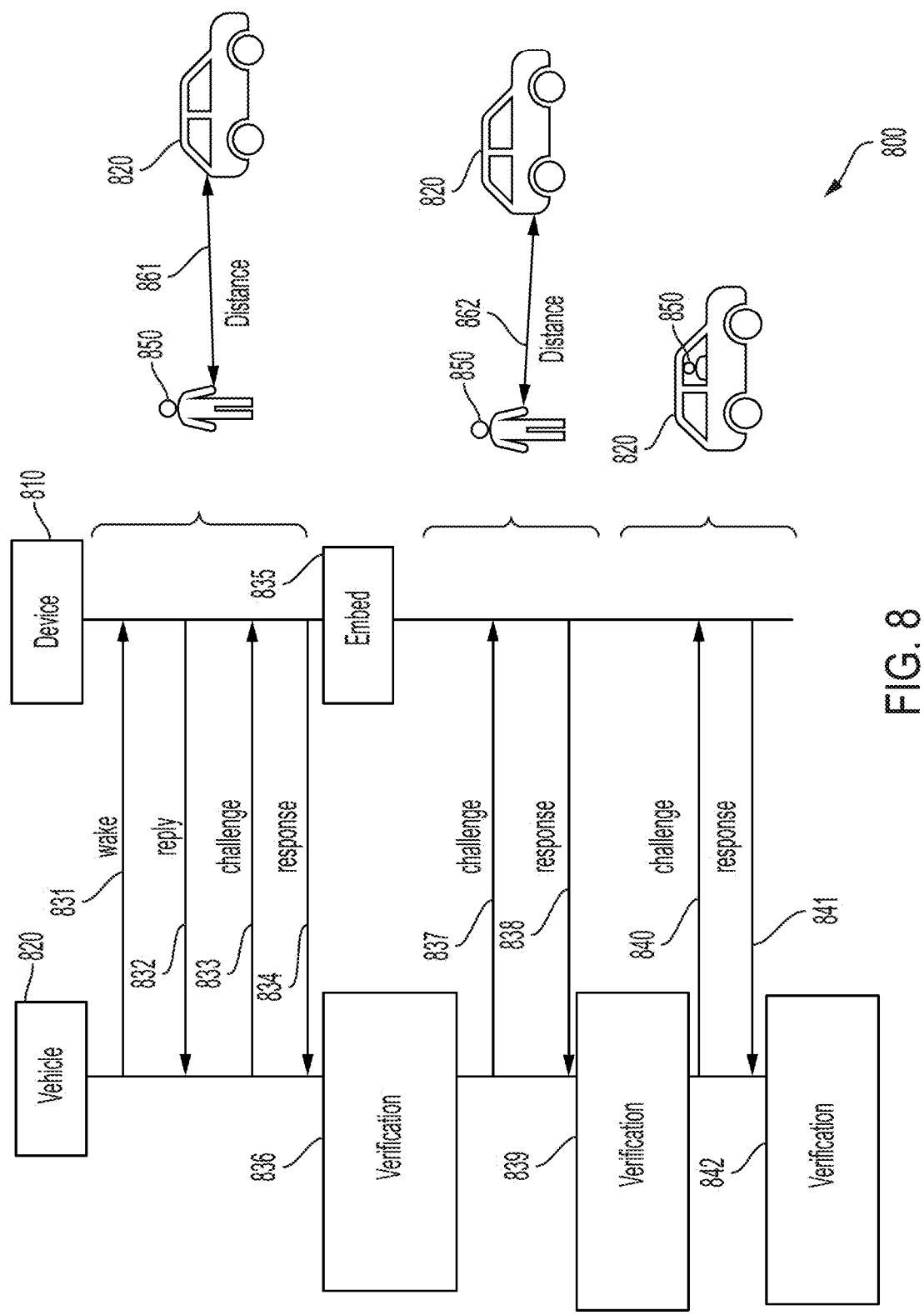
FIG. 8 is another illustration of communication between a device and vehicle according to a non-limiting embodiment of the present application.
Figure 9:
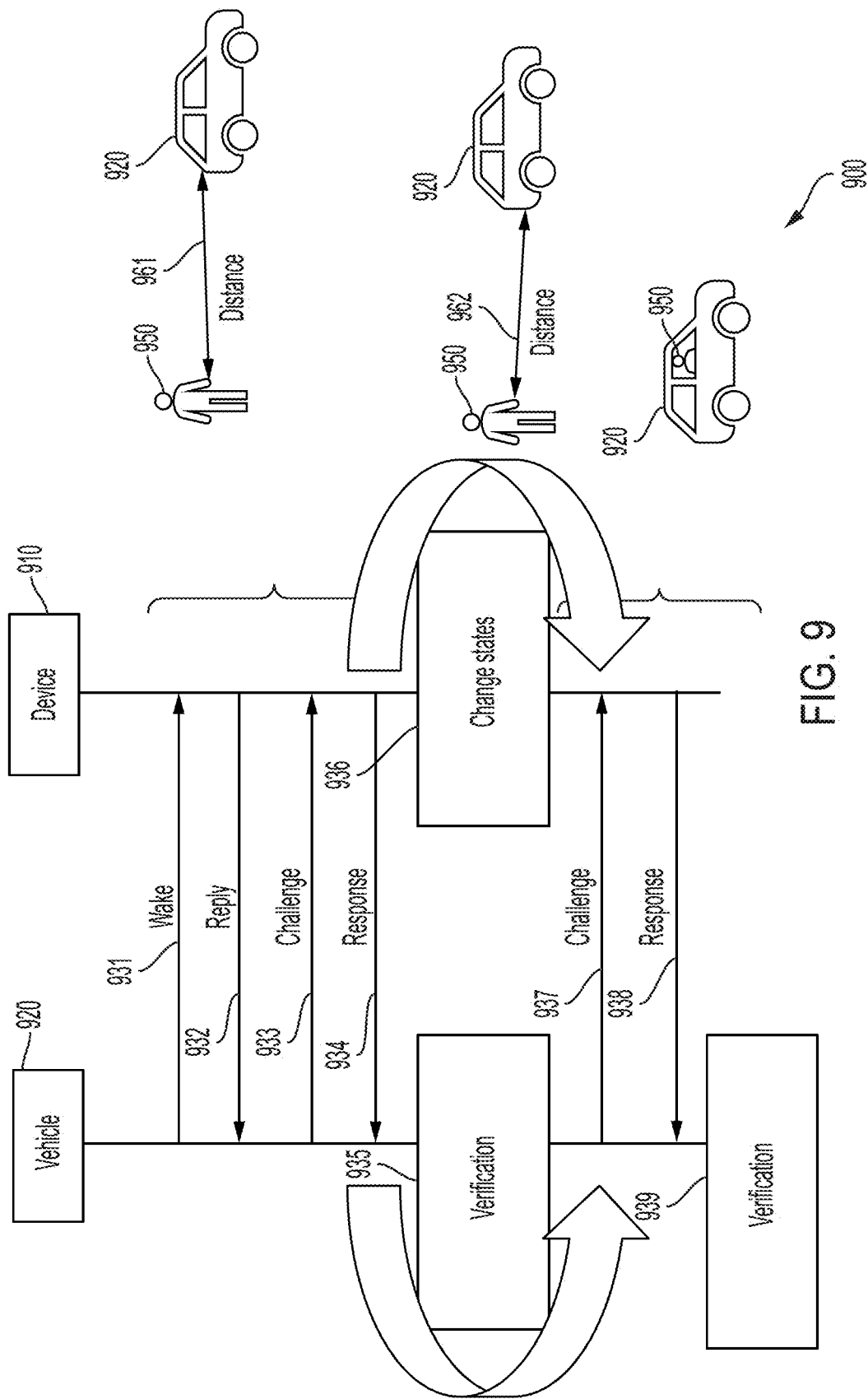
FIG. 9 is another illustration of communication between a device and vehicle according to a non-limiting embodiment of the present application.

In some embodiments, the methods of FIGS. 7, 8 and 9 may involve the use of techniques to obfuscate interrogation signals. For example, the vehicle may send several interrogation signals having different frequencies. The device may be configured to respond to only one frequency, or to an interrogation signal having a frequency within a range of frequencies. The vehicle may be configured to accept the response from the device produced in response to the one frequency or produced in response to a frequency from within the range of frequencies.

Figure 2A:
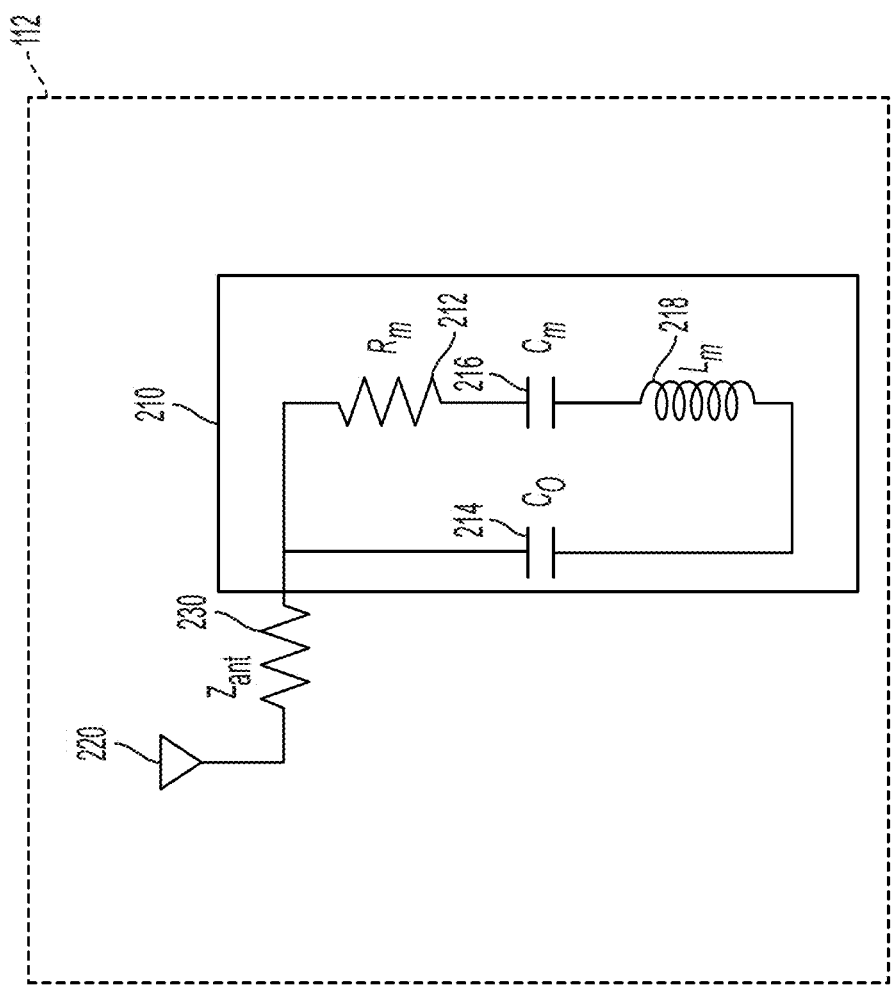
FIG. 2A is a circuit diagram of a passive radio according to a non-limiting embodiment of the present application.

As explained above, the passive radio 112 can take various forms, one of which is being formed of RLC components. FIG. 2A illustrates a non-limiting example. Specifically, FIG. 2A illustrates a circuit diagram of an example of a passive radio, according to a non-limiting embodiment of the present application. Passive radio 112 may include circuitry 210 and antenna 220. An impedance $Z_{ant}$ is provided between circuitry 210 and antenna 220, such as resistor 230. The circuitry 210 includes a capacitor 214 with a capacitance of $C_0$ in parallel with a resistor 212 having resistance $R_m$, a capacitor 216 with capacitance $C_m$, and an inductor 218 with inductance $L_m$. According to some embodiments, the components of passive radio 112 may be selected to respond only to substantially a single frequency or a narrow range of frequencies. For example, a narrow range of frequencies may include frequencies of one or more channels of a frequency band (e.g., the 5 GHz band, the 2.4 GHz band). For example, components including capacitor 214 and 216, resistance 212, and inductor 218 may be selected to have values such that the passive radio 112 has a high quality factor (Q). The passive radio 112 may be implemented as integrated circuitry on a semiconductor chip in some embodiments.

In operation, the components of circuitry 210 may be inactive until an interrogation signal is received on antenna 220. Receipt of a such a signal may result in the circuitry 210 producing a resonating response signal, which may be transmitted from the antenna 220 back to the vehicle (e.g., vehicle 120 of FIG. 1). The resonating response signal may decay in a manner distinctive to the combination of components of circuitry 210.

Figure 2B:
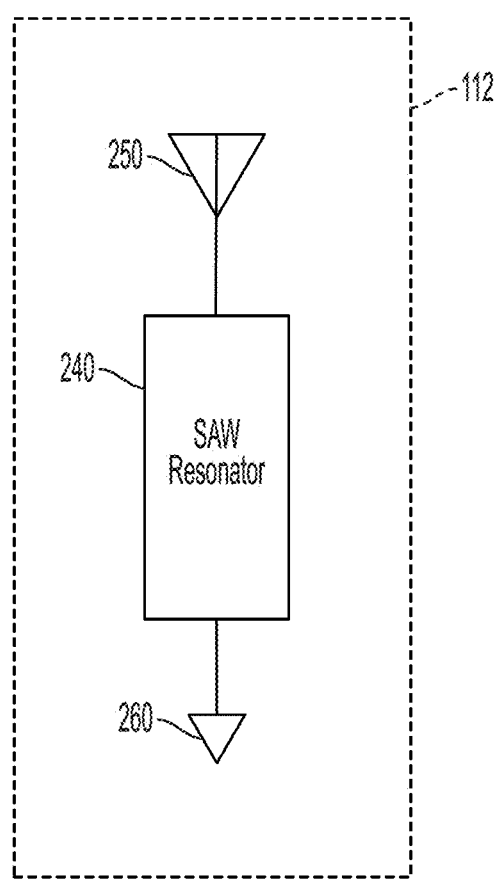
FIG. 2B is a circuit diagram of a passive radio with a SAW resonator according to a non-limiting embodiment of the present application.

In some embodiments, a passive radio for use in an RKE system, such as passive radio 112 of FIG. 1, may include a SAW resonator. FIG. 2B shows an example of a passive radio 112 including SAW resonator 240. The SAW resonator 240 may be connected to antenna 250 and grounded 260 by a grounding component. As in FIG. 2A the components of passive radio 112 in FIG. 2B may be selected such that the passive radio 112 has a high quality factor (Q). Having a high Q means that the passive radio will respond to specific frequencies such as substantially a single frequency or narrow range of frequencies. For example, the SAW resonator 240 may be configured to respond to only a first frequency. When interrogated by a first signal having the specified first frequency, the SAW resonator 240 will produce (e.g., reflect) a second signal (e.g., a ring down envelope). The second signal may be distinctive. For example, a reflected ring down envelope of SAW resonator 240 may have a distinctive shape which can subsequently be used to identify the device.

According to some embodiments, the SAW device may be fully passive, or may operate in a fully passive mode. For example, the SAW device may not draw power from a battery.

Referring to both FIGS. 2A and 2B, it should be appreciated that the passive radios illustrated are not part of a filter circuit and are not part of an active signal processing loop, such as a down-conversion or up-conversion signal loop. They are, in at least those embodiments illustrated, configured to reflect a signal rather than serving as a pass-through to other processing circuitry.

Figure 3:
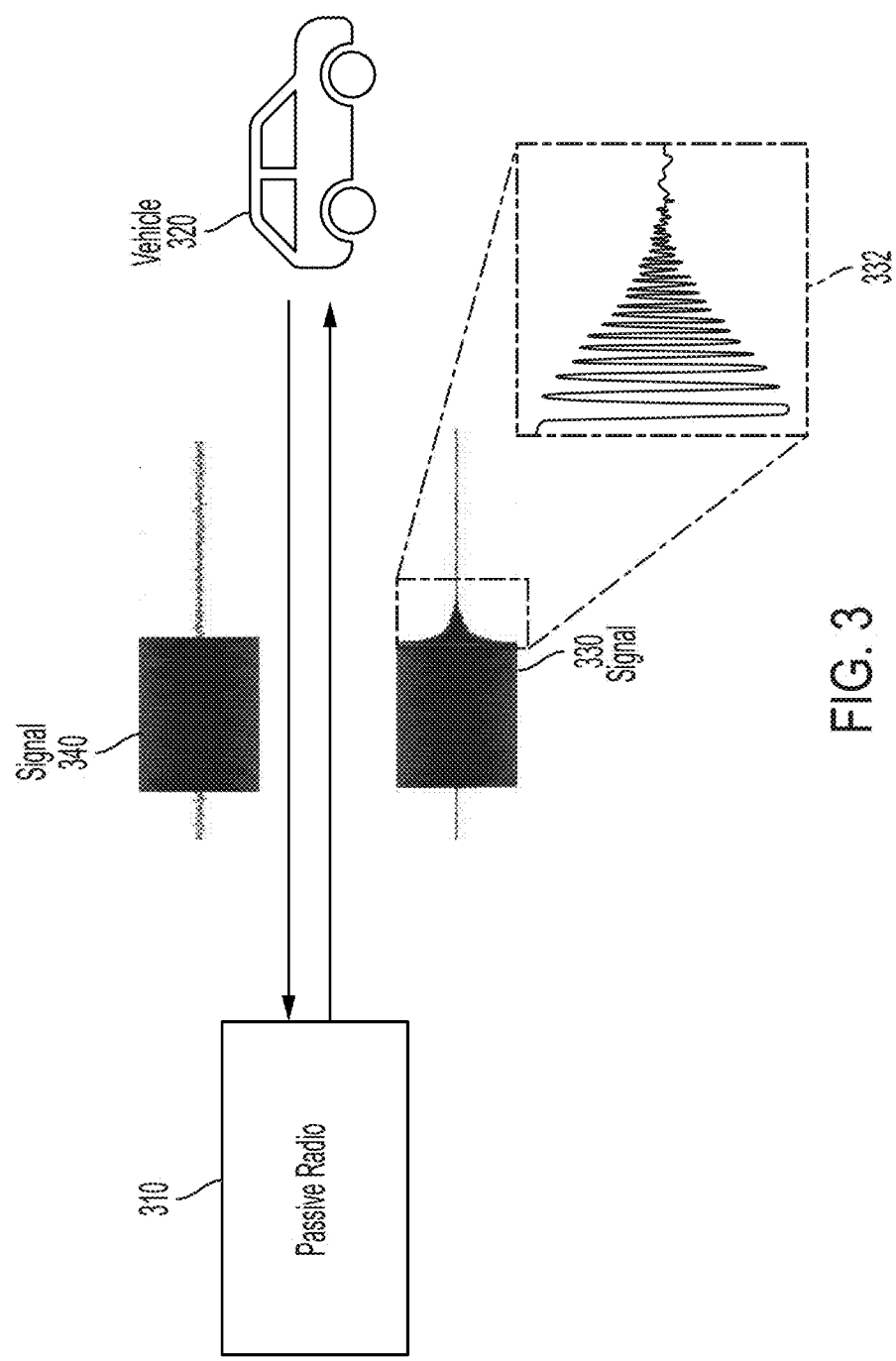
FIG. 3 illustrates an example of communication using a passive radio comprising a SAW resonator according to a non-limiting embodiment of the present application.

As has been described, a passive radio, such as one employing a SAW resonator of the type described in connection with FIG. 2B, may exhibit a distinctive response signal in response to a suitable interrogation signal. FIG. 3 illustrates a non-limiting example of such operation of a passive radio comprising a SAW resonator in the context of an RKE system.

In the example of FIG. 3, the vehicle 320 transmits a signal 340 to a passive radio 310 (e.g., as described in conjunction with FIG. 2A and FIG. 2B). The signal 340 may be, or include, an interrogation signal having a specified frequency for a period of time. For instance, the signal 340 may be a pulse. The passive radio 310 may be any of the types of passive radios described herein, for example being a passive radio of the type shown in FIG. 2B having a SAW resonator. The specified frequency of the interrogation signal is such that the passive radio 310 stores energy when interrogated by the specified frequency and subsequently reflects some of the stored energy with a distinctive waveform.

According to some embodiments, the passive radio 310 may detect a signal 340 from a distance d. The distance d may be limited by several factors based on the following formula:

$$d = \frac{G_{SAW}\sqrt{G_{r,ant}G_{s,ant}}}{2} \frac{c}{\omega} \left(\frac{P_t}{P_{r,sensitivity}}\right)^{1/4} \quad (1)$$

In equation (1), the $G_{SAW}$ is gain (loss) due to energy transfer to the passive radio. In one embodiment, $G_{SAW}$ may be −6 decibel (dB) or substantially −6 dB. The $G_{r,ant}$, $G_{s,ant}$ are the values of the reader and sensor antenna gains and ω is the angular frequency and equivalent to the product of 2π and the frequency. The variable c is the speed of light, $P_t$ is the transmitted power and $P_{r,sensitivity}$ is the receiver sensitivity.

When the passive radio 310 receives the signal 340 including the first frequency, it will produce a response signal 330. The response signal may be substantially the same frequency as the signal 340, for instance when the response signal 330 is a reflection of the signal 340. In some embodiments, the response signal includes a decaying portion 332, illustrated in this example as a ring down signal with a decaying envelope. For instance, when the passive radio 310 includes a SAW resonator (e.g., SAW resonator 240 of FIG. 2B), the SAW resonator may be prompted to resonate by the signal 340 and may produce the response signal 330 with the decaying portion 332 having the distinctive decaying envelope arising from the nature of that particular SAW resonator. The distinctive shape of the decaying portion 332 may be used to identify the passive radio (or device in which the passive radio is disposed), and thus may be used as a RKE device to perform the functions of such devices described herein.

Figure 4:
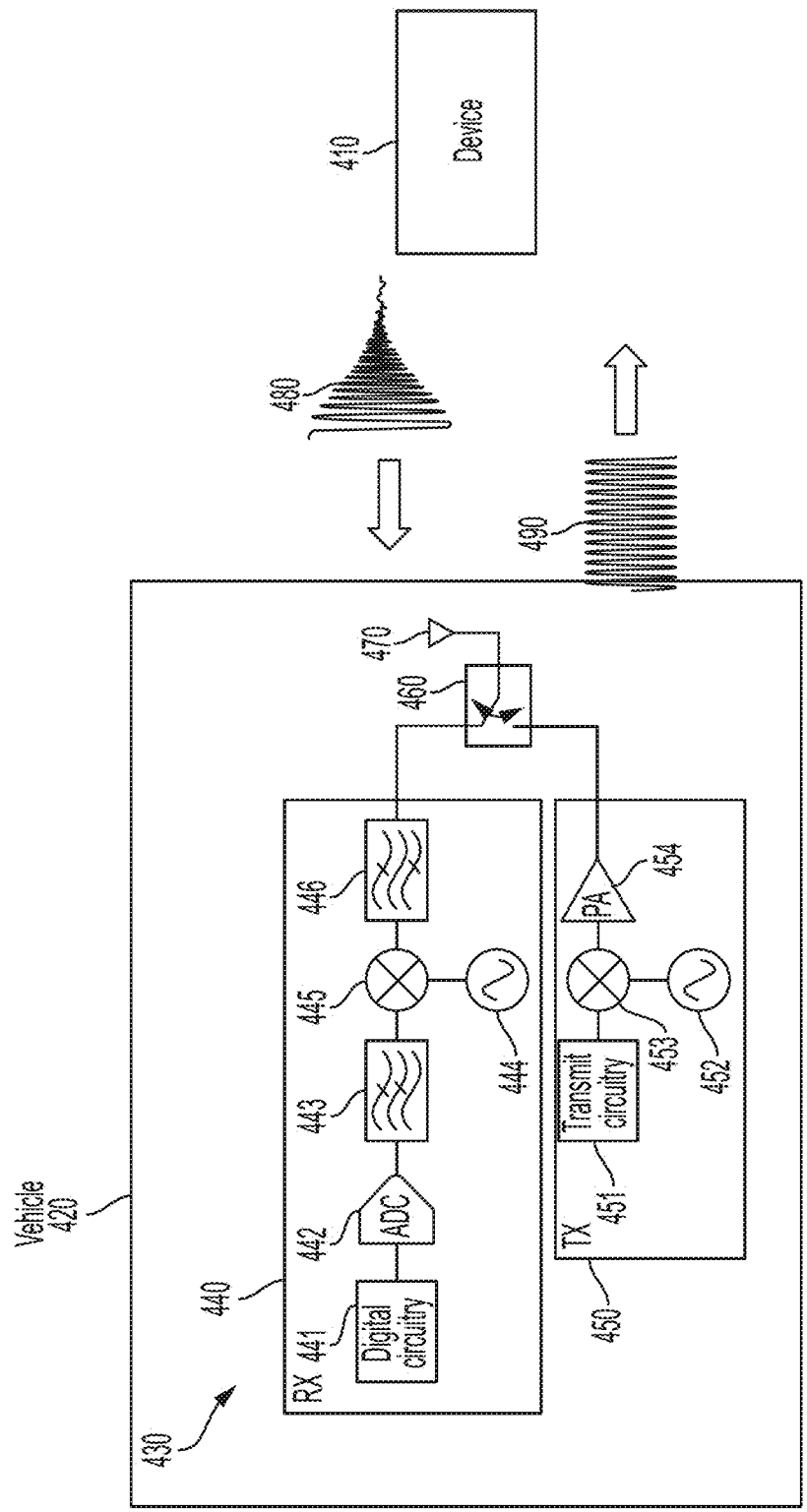
FIG. 4 is an illustration of communication between a device and a vehicle according to a non-limiting embodiment of the present application.

FIG. 4 illustrates an example RKE system including a detailed illustration of the circuitry of a vehicle transceiver which may support communication of the type illustrated in FIG. 3, and which may therefore be used as part of a RKE system according to aspects of the present application.

The vehicle 420 may include circuitry 430 configured to transmit and receive signals to and from RKE device 410 and perform processing operations. The RKE device 410 may be any RKE device described herein. In the example of FIG. 4, the circuitry 430 includes receiver 440 and transmitter 450. The antenna 470 may be coupled to receiver 440 and transmitter 450 through switch 460. In some embodiments, the circuitry 430 may be configured to change switch 460 such that the antenna is coupled to the receiver and transmitter at different times corresponding to transmit and receive operations of the circuitry 430.

The transmitter 450 is configured to transmit signals to the RKE device 410, such as signal 490. The signal 490 may be a signal of a particular frequency known to produce a distinctive response signal from the RKE device 410, for example, as discussed in relation with FIG. 2A, FIG. 2B, and FIG. 3. The transmitter 450 may include transmit circuitry 451 configured to output a transmit signal to mixer. For example, the transmit signal may be output in response to determining that the vehicle is within a close range of the RKE device 410. In another example, the transmit signal may be output in response to the receiver 440 receiving a signal. Power amplifier 454 may amplify the signal from mixer 453 to a high-power signal and the high-power signal may be provided to the antenna 470 for transmission. Mixer 453 may be provided with a voltage (e.g., alternating current (AC) voltage) from voltage source 452.

The receiver 440 is configured to receive a signal, such as signal 480 from RKE device 410. The signal 480 may be a response signal sent by the RKE device 410 in response to the RKE device 410 receiving signal 490 from the vehicle 420. The signal 480 may exhibit a distinctive shape produced in response to the RKE device 410 receiving an interrogation signal of a specific frequency (or range of frequencies), for example, as discussed in relation with FIG. 2A, FIG. 2B, and FIG. 3. The signal 480 is received from antenna 470 and then filtered by bandpass filter 446 and output to mixer 445. Mixer 445 may be provided with a voltage (e.g., AC voltage) from voltage source 444. The signal may then be passed through low pass filter 443. Subsequently, the filtered signal may be converted to a digital signal using an analog to digital converter (ADC) 442. The digital signal is then processed using digital circuitry 441. Digital circuitry 441 may be configured to determine if the signal 480 from the device 410 is an expected signal before providing access to the vehicle or ignition of the vehicle. For example, the digital circuitry may compare the bits of the processed signal to bits stored in a memory or local storage of the digital circuitry. The digital circuitry 441 may determine whether the signal 480 exhibits an expected decaying signal envelope, or some other expected characteristic associated with signals produced by RKE device 410. For example, the RKE device 410 may include a passive radio having a SAW resonator, whereby the passive radio produces to an oscillating response signal having a characteristic decaying envelope dictated by the SAW resonator, and the digital circuitry 441 may analyze the signal 480 to determine whether it exhibits the expected decaying envelope.

According to some embodiments, the transmitter 450 may be configured to send wake up signals and challenge signals. For example, the transmit circuitry may be configured to periodically transmit wake up signals. The receiver 440 may be configured to receive a response to the wakeup signal. The transmit 450 may also be configured to send a challenge signal in response to receiving the response to the wake up signal. Examples of such behavior are described further below in connection with FIGS. 7-9.

Although FIG. 4 illustrates one configuration of transceiver circuitry of a vehicle that may be used in an RKE system according to some embodiments of the present application, other configurations are also possible. For instance, additional components, fewer components, or different components of a transceiver may be included. Also, a vehicle 420 may include multiple transceivers configured to communicate with RKE device 410. Thus, FIG. 4 illustrates a non-limiting example.

As previously described, in some aspects of the present application, a RKE device may include one or more passive radios to perform multiple functions of an RKE system. The multiple functions may include accessing a vehicle (e.g., locking/unlocking the vehicle) and starting the vehicle. Those two functions may be differentiated by different passive radio responses. That is, a first passive radio response may initiate locking/unlocking of the vehicle and a second passive radio response may initiate ignition of the vehicle. The different responses may differ in signal frequency, as one example. For example, a signal of a first frequency may be sent by the RKE device to control access to the vehicle, and a signal of a second frequency may be sent to control ignition of the vehicle.

Figure 5:
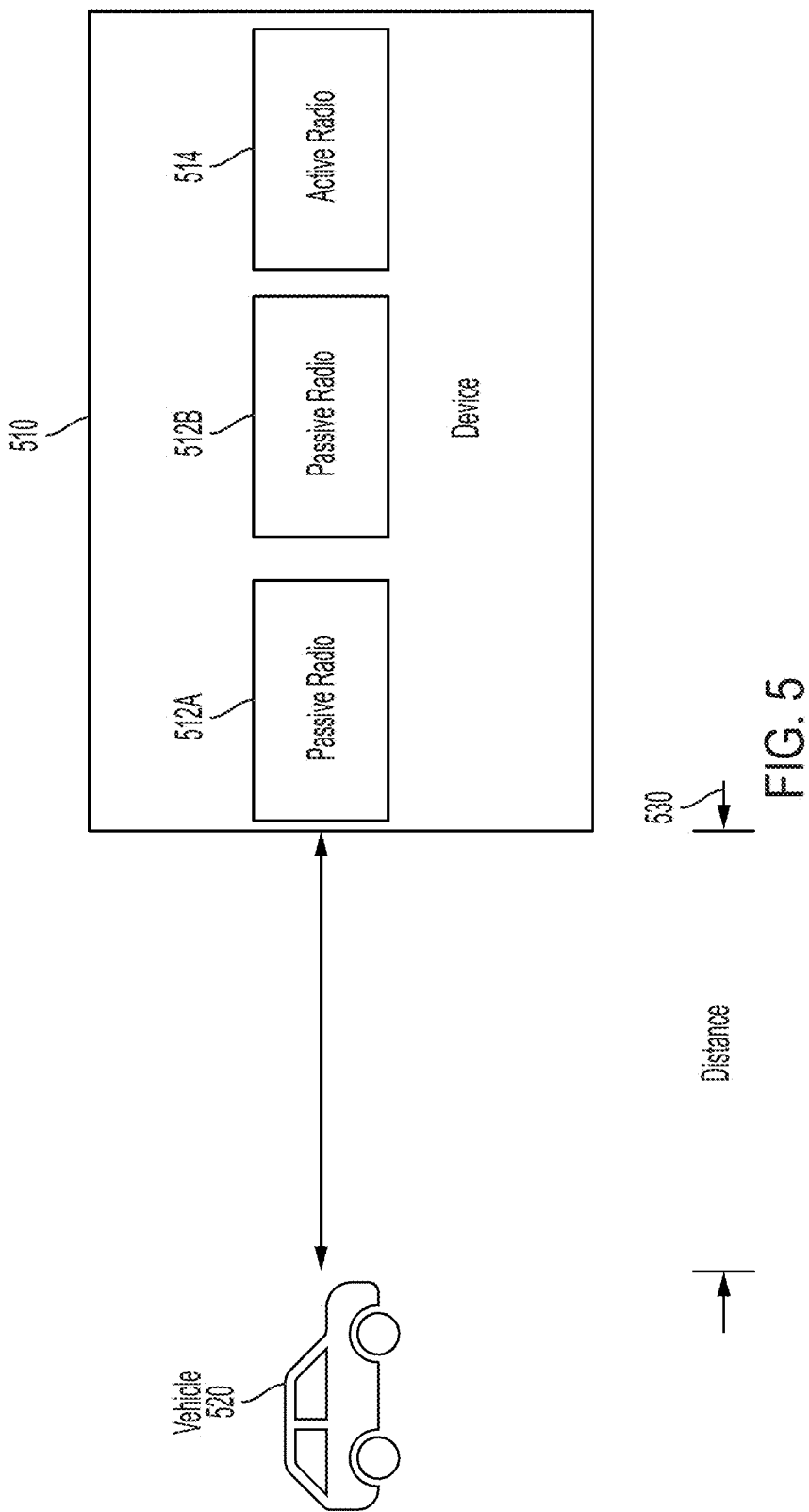
FIG. 5 illustrates a RKE system including multiple passive radios according to a non-limiting embodiment of the present application.

According to an aspect of the present application, a RKE device for use in an RKE system includes multiple passive radios having different response characteristics. The different response characteristics of the different passive radios can control different functions of the RKE system, such as those described above. FIG. 5 illustrates an example embodiment in which the RKE device includes multiple passive radios. The system of FIG. 5 includes RKE device 510 and vehicle 520. The RKE device 510 comprises a first passive radio 512A and a second passive radio 512B as well as active radio 514. The vehicle 520 may be a distance 530 away from the RKE device 510.

The vehicle 520 may be the same as the vehicle 120 of FIG. 1 and take any of the forms described in connection with vehicle 120.

The first passive radio 512A and the second passive radio 512B may each be of any of the types described herein, including for example the types illustrated in FIGS. 2A and 2B. In some embodiments, the first passive radio 512A and second passive radio 512B are the same type as each, and in other embodiments they are different types than each other.

The first passive radio 512A and second passive radio 512B may have different resonance frequencies than each other. For example, the first passive radio 512A may have a first resonant frequency, such that the first passive radio produces a first signal (e.g., a ring down envelope) in response to receiving a signal of the first resonant frequency. The second passive radio 512B may have a second resonant frequency, such that the second passive radio produces a second signal (e.g., a ring down envelope) in response to receiving a signal of the second resonant frequency. The response signal of the first passive radio 512A differs from the response signal of the second passive radio 512B because of the different resonance frequencies. Thus, signals from the two passive radios may be distinguished from each other.

The first and second passive radios 512A and 512B may be used to perform different functions of the RKE device. For example, when the distance 530 between the vehicle 520 and device 510 is less than a first threshold, the vehicle 520 may transmit a signal of the first resonant frequency to the RKE device 510. For example, the vehicle 520 may include circuitry 430 as shown in FIG. 4, and transmit the signal using transmitter 440 as shown in FIG. 4. In response to receiving the signal, the first passive radio 512A may transmit a first signal. On verifying the first signal, a first function of the RKE device 510 may be performed. For example, the vehicle 520 may unlock or otherwise provide access to the vehicle 520.

In some examples, when the distance 530 between vehicle 520 and RKE device 510 is less than a second threshold (e.g., the device is in the vehicle), the vehicle 520 may transmit a signal (e.g., using transmitter 440) of the second resonant frequency to the RKE device 510. In response, the second passive radio 512B may transmit a second signal. On verifying the second signal, a second function of the RKE device 510 may be performed. For example, the second function may be ignition of the vehicle 520.

According to some embodiments, more than two passive radios may be included in RKE device 510. In some examples, each passive radio and corresponding resonant frequency may be used to perform different functions of the RKE system.

The threshold distance may assume any suitable value. In some embodiments, the threshold distance may be several meters. For example, the threshold distance may be any distance less than 10 meters, less than 5 meters, or any other suitable distance.

The vehicle may send a wake up signal periodically or constantly to the RKE device. The RKE device may be able to receive the wake up signal at a first distance or less from the vehicle. When the RKE device is within a distance that allows the RKE device to receive the wake up signal, the RKE device may transmit an acknowledgement signal in response to the wake up signal. The vehicle may determine that the RKE device is at a distance at or less than the threshold distance based on receiving the acknowledgement signal from the device.

According to some embodiments, the threshold distance may be a predetermined distance (e.g., set by the manufacturer). The vehicle may use the length of the period of time it takes from transmitting the wake up signal to receiving the acknowledgment signal to determine a distance or range of the device from the vehicle.

Figure 6A:
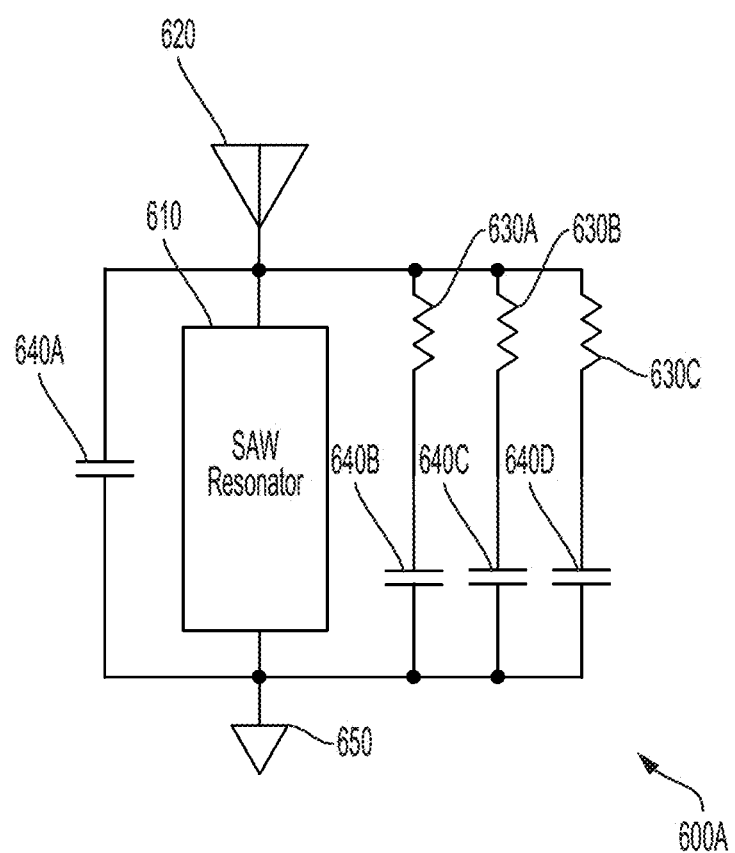
FIG. 6A is a circuit diagram of a passive radio including a SAW resonator coupled to circuitry configured to adjust a resonance frequency of the passive radio according to a non-limiting embodiment of the present application.

The resonant frequency of a SAW resonator may be adjusted with surrounding circuitry. Therefore, in those embodiments in which an RKE device includes multiple passive radios with different resonance frequencies, the different resonance frequencies may be achieved by designing the passive radios to have SAWs exhibiting different resonance frequencies in some embodiments. For example, components of the SAW resonator may be adjusted statically at the time of manufacture so that the SAW resonator may have a different resonant frequency. FIG. 6A is a circuit diagram of a passive radio having a resonance frequency set by a SAW resonator of the passive radio in combination with surrounding circuitry. The frequency of the passive radio can be programmed by combining different programmable resistor-capacitor (RC) paths.

For example, the passive radio 600A includes antenna 620 for transmitting and receiving signals, SAW resonator 610, ground component 650, and capacitor 640A. The passive radio also includes three resistor-capacitor paths in parallel with the SAW resonator and capacitor 640A. The first RC path includes resistor 630A and capacitor 640B. The second RC path includes resistor 630B and capacitor 640C. The third RC path includes resistor 630C and capacitor 640C. Different combinations of RC paths with components of different values may change the resonant frequency of the SAW resonator and as such, of the passive radio. Thus, passive radios with different combinations of the illustrated resistors and capacitors may exhibit different resonance frequencies even if the passive radios have the same SAW resonator.

Figure 6B:
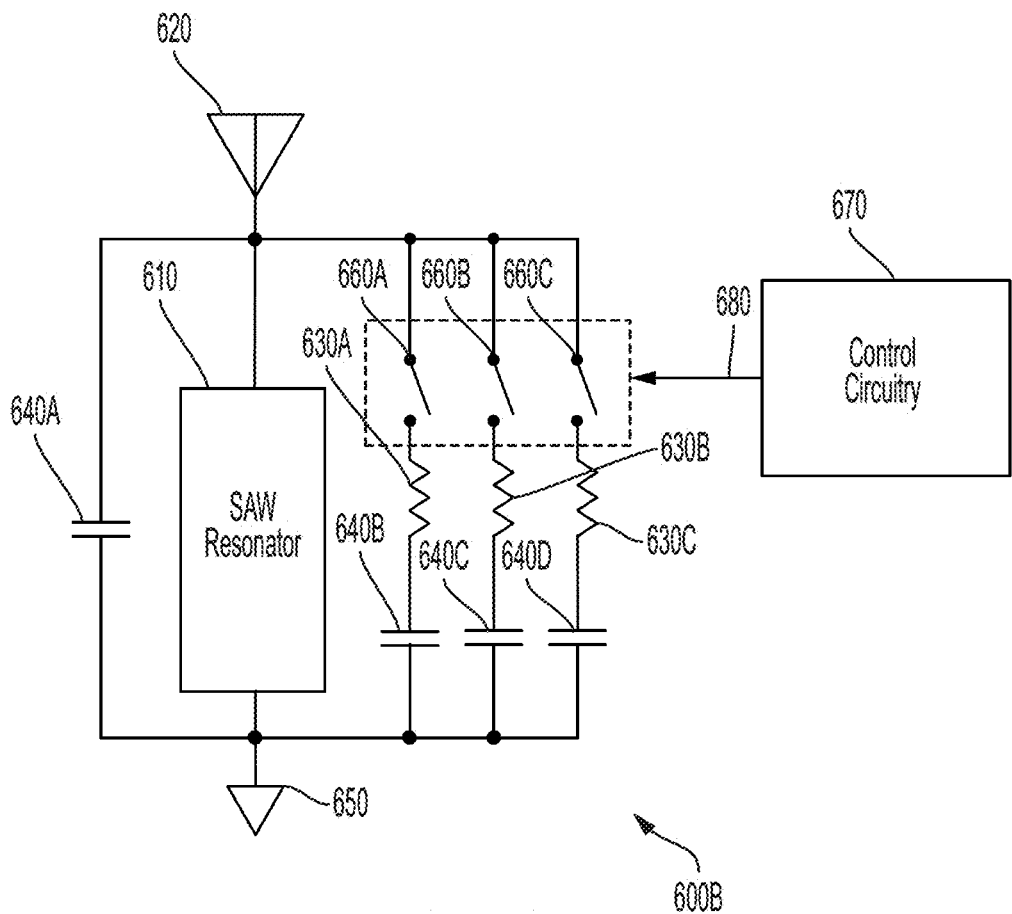
FIG. 6B is a circuit diagram of an exemplary programmable passive radio having a programmable resonance frequency according to a non-limiting embodiment of the present application.

According to some embodiments, the RKE device may include a programmable passive radio configured to control multiple functions of the RKE system. For example, rather than including multiple passive radios with different resonant frequencies, the RKE device may include a single passive radio with a programmable resonance frequency. The passive radio may include programmable circuitry couplable to a SAW resonator to dynamically adjust the resonance frequency of the SAW resonator. FIG. 6B illustrates an example.

FIG. 6B is a circuit diagram of an exemplary programmable passive radio 600B. In addition to the components of the passive radio 600A of FIG. 6A, the passive radio 600B includes switches 660A, 660B, and 660C in respective resistive paths. Each of the switches is controlled by control circuitry 670. For example, the control circuitry may open and close the switches 660A-660C by transmitting a signal 680. By controlling (e.g., opening and closing) the different switches, the control circuitry 670 may vary the combination of RC paths and adjust the resonant frequency of the passive radio during operation.

Programmable passive radios such as that illustrated in FIG. 6B may be configured to control multiple functions of the RKE system. For example, when an RKE device (e.g., the device of any of the prior figures) is within a first threshold distance of a vehicle the device may be operable to control a first function (e.g., accessing the vehicle) and the control circuitry of the device may be configured to close switch 660A and open switches 660B-660C such that the first RC path is connected to the SAW resonator and the second and third RC paths are not. When the first RC path is closed, the frequency of the passive radio is modified, and the passive radio is configured to respond to a first resonant frequency. The vehicle may transmit a first signal of the first resonant frequency while the device is within the first threshold distance. The device may respond to the first signal. On receiving and verifying the authenticity of the response signal, the vehicle may perform the first function.

When the RKE device is within a second threshold distance of a vehicle the device may be operable to control a second function (e.g., ignition) and the control circuitry of the device may be configured to close switch 660B and open switches 660A and 600C such that the second RC path is connected to the SAW resonator and the first and third RC paths are not. When the second RC path is closed, the frequency of the passive radio is modified to be different from the first resonant frequency, and the passive radio is configured to respond to a second resonant frequency. The vehicle may transmit a second signal of the second resonant frequency while the device is within the second threshold distance. The device may respond to the second signal and on receiving and verifying the authenticity of the response signal, the vehicle may perform the second function.

Additionally or alternatively, the passive radio of any of the types of passive radios described herein (e.g., any of passive radios 600A, 600B, and 112) may be shorted when outside of a determined range (e.g., outside of a determined Bluetooth Low Energy (BLE) range). In some embodiments, the passive radio may be defaulted to shorting the passive radio and/or SAW device of the passive radio such that the passive radio and/or SAW device may operate with no battery.

RKE systems and devices of the types described may be used to control access to a vehicle and/or ignition of a vehicle in different ways. Some non-limiting examples are now described.

FIG. 7 is an illustration of a communication scheme 700 between the device 710 and vehicle 720. The user 750 holding device 710 may approach vehicle 720. The device 710 is a distance 761 away from the vehicle 720. At step 731, the vehicle 720 transmits a wake up signal, which may be received by device 710. The distance 761 may be a distance at which the device can receive the wake up signal. In some embodiments, distance 761 is greater than 1 meter, although other distances are possible. In response, at step 732, the device transmits a reply signal. At step 733, in response to receiving the reply signal from step 732, the vehicle 720 transmits a challenge. At step 734, the device responds to the challenge with a response. Steps 733 and 734 may be part of a challenge-response protocol. In some embodiments, steps 731-734 are performed using an active radio in the device 710, such as a Bluetooth® low energy (BLE) radio.

In response to receiving the response of step 734, vehicle 720 may verify the response at step 735. For example, as described with respect to FIG. 4, the vehicle may comprise circuitry configured to compare the response with an expected response. If the response is different from the expected response, the device may fail to be verified.

If the device is verified and the device is a distance 762 within a first threshold value, the vehicle 720 may transmit a challenge at step 736. The distance 762 may be less than 1 meter in some embodiments, but other distances are possible. In response to receiving the challenge of step 736, the device may transmit a response at step 737. According to some embodiments, the challenge of step 736 may be a signal of a first frequency. The device may transmit a resonating ringdown signal to the vehicle in response to receiving the signal of the first frequency, as described herein. The response of step 737 may be any of the response signals of passive radios described herein.

In response to receiving the response of step 737, vehicle 720 may verify the response at step 738 using the methods described herein. If the response of step 737 is different from the expected response, the device may fail to be verified. If the device is verified, a first function of the device may be performed. For example, the vehicle may be opened.

If the device is verified and the device is a distance within a second threshold value (e.g., indicating the user is in the vehicle), the vehicle 720 may transmit another challenge at step 739 (e.g., for performing a second function of the device). In response to receiving the challenge of step 739, the device may transmit a response at step 740. According to some embodiments, the challenge of step 739 may be a signal of a second frequency. A passive radio of the device may transmit a resonating ringdown signal to the vehicle as the response of step 740.

In response to receiving the response of step 740, vehicle 720 may verify the response at step 741 using methods described herein. If the response of step 740 is different from the expected response, the device may fail to be verified. If the device is verified, the second function of the device may be performed. For example, the vehicle may be turned on.

As described herein, the device 710 may include multiple passive radios and/or include a programmable passive radio. For example, the first frequency may be a resonant frequency of a first passive radio, and not a second passive radio of the device. On receiving the first frequency, the first passive radio may transmit a first signal. The second frequency may be a resonant frequency of a second passive radio, and not the first passive radio of the device. On receiving the second frequency, the second passive radio may transmit a second signal.

In some embodiments, the device 710 includes a programmable passive radio. For example, the first frequency may be a resonant frequency of the programmable passive radio at a first configuration. On receiving the first frequency, the first passive radio may transmit a first signal. The second frequency may be a resonant frequency of a second configuration of the programmable passive radio. At a second distance within the second distance threshold, the control circuitry of the programmable passive radio may reconfigure the radio from the first configuration to the second configuration (e.g., by using different combinations of RC paths). On receiving the second frequency, the passive radio may transmit a second signal.

In some embodiments, the challenges at steps 733, 736 and/or 739 may be obfuscated. For example, the vehicle 720 may send several challenges at one or more of steps 733, 736 and/or 739. For example, vehicle 720 may send challenges having multiple different frequencies. The device 710 may be configured to respond to only one frequency, or to a challenge having a frequency within a range of frequencies. The different frequencies may be predetermined. In some examples, if the device does not respond (e.g., the vehicle does not receive a response) or responds at an incorrect frequency (e.g., a frequency outside the range of frequencies and/or not the frequency the device is configured to respond to), the vehicle 720 may be configured to reduce the speed of transmission of the challenges. During verification (e.g., steps 735, 738, and/or 741), the vehicle may confirm that the device responded to a correct frequency (e.g., a frequency within the range of frequencies and/or the frequency the device is configured to respond to).

According to some embodiments, an RKE device includes a temperature sensor. The temperature value measured using the temperature sensor may be used in verifying the device as part of an RKE process. FIG. 8 illustrates an example.

FIG. 8 is an illustration of a communication scheme 800 between the device 810 and vehicle 820. The user 850 holding device 810 may approach vehicle 820. The device 810 is a distance 861 away from the vehicle 820. At step 831, the vehicle 820 transmits a wake up signal, which may be received by device 810. The distance 861 may be a distance at which the device can receive the wake up signal. The distance 861 may be greater than 1 meter in some embodiments, but other distances are possible. In response, at step 832, the device transmits a reply signal. At step 833, in response to receiving the reply signal of step 832, the vehicle 820 transmits a challenge. At step 834, the device responds to the challenge of step 832 swith a response. At step 835, the device may transmit the temperature of the device to the vehicle (e.g., embedded, encoded into the signal, etc.). Steps 833 and 834 may be part of a challenge-response protocol. In some embodiments, the signals of step 834 and 835 may be sent in a single signal. An active radio of the device 810 may perform the steps 831-834.

In response to receiving the response of step 834, vehicle 820 may verify the response of step 834 at step 836 and also process and store the temperature value. For example, as described with respect to FIG. 4, the vehicle may comprise circuitry configured to compare the response with an expected response. If the response of step 834 is different from the expected response, the device may fail to be verified.

If the device is verified and the device is a distance 862 within a first threshold value, the vehicle 820 may transmit a challenge at step 837. The distance 862 may be less than 1 meter in some embodiments, but other values are possible. In response to receiving the challenge of step 837, the device may transmit a response at step 838. The response at step 838 may be a signal modulated based on a measured temperature of the device.

In response to receiving the response of step 838, vehicle 820 may verify the response at step 839. Using the temperature value transmitted at step 835, the vehicle may determine an expected signal response based on the given temperature. If the response is different from the expected response, the device may fail to be verified. If the device is verified, a first function of the device may be performed.

If the device is verified and the device is a distance within a second threshold value (e.g., the user is in the vehicle), the vehicle 820 may transmit another challenge at step 840 (e.g., for performing a second function of the device). In response to receiving the challenge of step 840, the device may transmit a response at step 841.

In response to receiving the response of step 841, vehicle 820 may verify the response at step 842 using methods described herein. If the device is verified, the second function of the device may be performed.

According to some embodiments, the challenges at steps 833, 837 and/or 840 may be obfuscated as described in scheme 700. The verification at steps 836, 839, and/or 842 may also be performed as described in scheme 700.

According to some embodiments, the device and vehicle may modulate the communicated signals based on a current state of the device. For example, the device and vehicle may update a current state based on a next state for each communication and/or successful verification.

For example, a vehicle and device may be programmed to update its state for each challenge and response. After, or prior to, each challenge, the device and vehicle may be configured to update the states (e.g., by increasing a counter). During the response, the device can modulate the response to the challenge based on the counter (e.g., by frequency hopping, by adding a megahertz to the response signal). During the subsequent verification, the vehicle will apply the same modulation to the expected answer to the challenge. The vehicle may then compare the responses.

FIG. 9 is an illustration of a communication scheme 900 between the device 910 and vehicle 920. The device 910 and vehicle 920 may have corresponding current states (e.g., current states that are equal). The user 950 holding device 910 may approach vehicle 920. The device 910 is a distance 961 away from the vehicle 920. At step 931, the vehicle 920 transmits a wake up signal, which may be received by device 910. The distance 961 may be a distance at which the device can receive the wake up signal. For example, the distance 961 may be greater than 1 meter in some embodiments, although other distances are possible. In response, at step 932, the device transmits a reply signal. At step 933, in response to receiving the reply signal of step 932, the vehicle 920 transmits a challenge. At step 934, the device responds to the challenge with a response. According to some embodiments, the response of step 934 may be based on a current state of the device. For example, the device may modulate the response at step 934 based on the current state of the device. Steps 933 and 934 may be part of a challenge-response protocol. An active radio of the device 810 may perform the steps 931-934.

In response to receiving the response of step 934, vehicle 920 may verify the response of step 934 based on a corresponding current state of the vehicle at step 935. For example, as described with respect to FIG. 4, the vehicle may comprise circuitry configured to compare the response of step 934 with an expected response. If the response of step 934 is different from the expected response, the device may fail to be verified. At step 936, both the vehicle and device may update their states (e.g., by increasing a counter).

If the device is verified and the device is a distance 962 within a first threshold value (e.g., external to the car, or inside the car), the vehicle 920 may transmit a challenge at step 937. In response to receiving the challenge, the device may transmit response at step 938. According to some embodiments, the response of step 938 may be based on the current state of the device.

In response to receiving the response of step 938, vehicle 920 may verify the response at step 939 based on a corresponding current state of the vehicle using the methods described herein. If the response of step 938 is different from the expected response, the device may fail to be verified. If the device is verified, a first function of the device may be performed. For example, the vehicle may be opened.

According to some embodiments, when a battery of the device 910 is low and/or dead, the device 910 may be configured to store the last known state(s) of the device 910. The vehicle 920 may also be configured to store one or more last known state(s) of the vehicle corresponding to the last known state(s) of the device. The stored states of the device 910 may be used by the vehicle 920 to identify the device at the vehicle. For example, the vehicle may compare the states stored by the vehicle and device.

According to some embodiments, the challenges at steps 933 and/or 937 may be obfuscated as described in scheme 700. The verification at steps 935 and/or 839 may also be performed as described in scheme 700.

FIGS. 7-9 illustrate non-limiting examples of the operation of an RKE system utilizing a passive radio. Other manners of operation are also possible.

Figure 10:
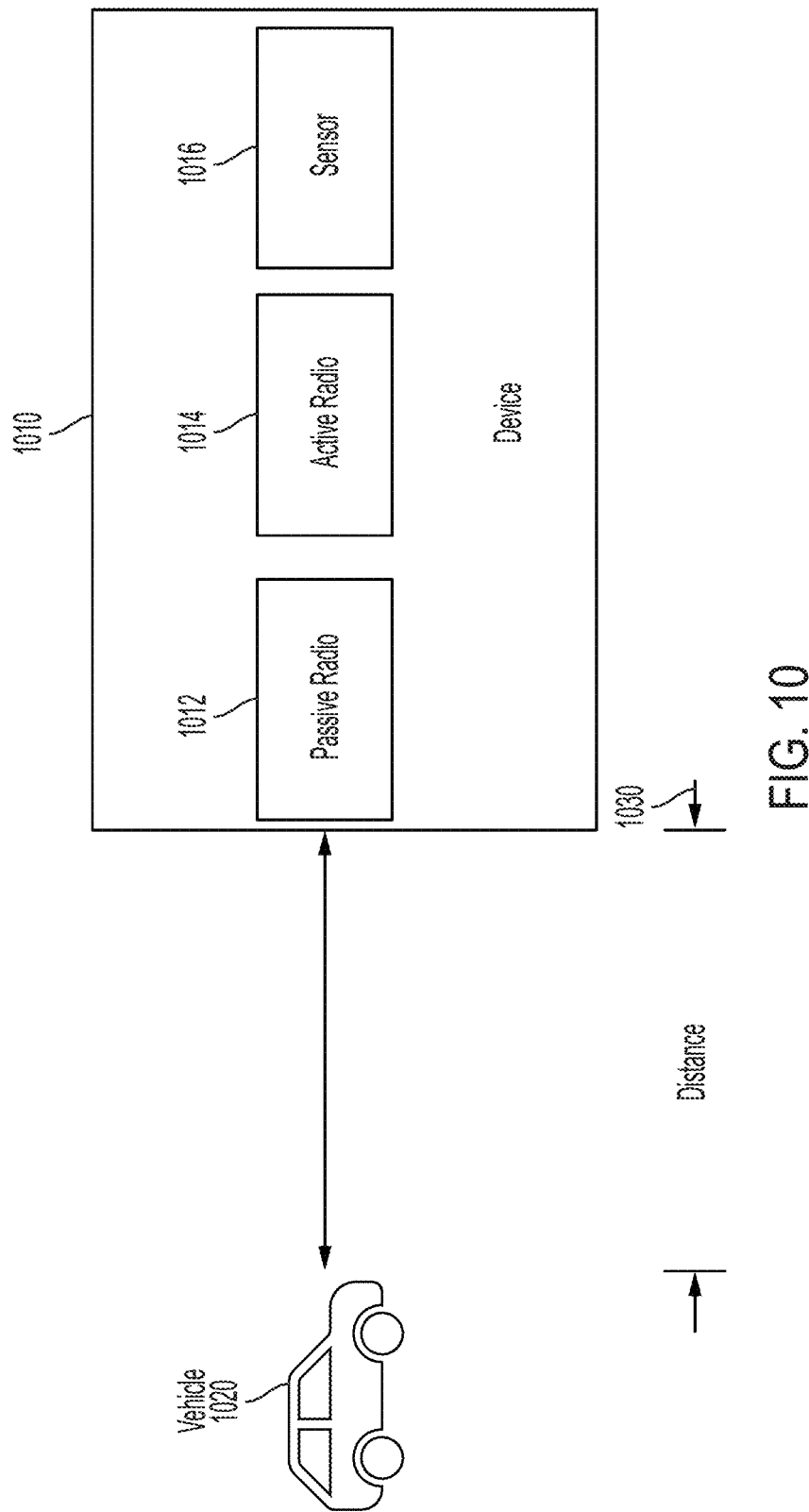
FIG. 10 illustrates an exemplary RKE system including a sensor according to a non-limiting embodiment of the present application.

According to some embodiments of the present application, an RKE device includes an inertial sensor. The inertial sensor may be used to detect motion of the RKE device, and certain functions of the RKE device may be gated based on whether motion is detected. For example, FIG. 10 illustrates an example embodiment in which the RKE device includes an inertial sensor. The system of FIG. 10 includes vehicle 1020, and RKE device 1010. The RKE device 1010 includes a passive radio 1012, active radio 1014, and sensor 1016. The RKE device 1010 may be a distance 1030 from the vehicle 1020.

The vehicle 1020 may be the same as vehicle 120 of FIG. 1. The passive radio 1012 may be the same as passive radio 112 of FIG. 1. The active radio 1014 may be the same as active radio 114 of FIG. 1. The distance 1030 may be the same as distance 130 of FIG. 1.

The sensor 1016 may be an inertial sensor such as an accelerometer and/or a gyroscope. In some embodiments, the device 1010 may use the accelerometer to determine whether or not the device 1010 is moving (e.g., if the sensor values exceed or go below threshold value(s)). The device 1010 may not receive and/or transmit signals when the device is stationary. For example, the device may disconnect the antenna if the sensor 1016 does not detect motion. By contrast, in some embodiments the passive radio 1012 will communicate response signals to the vehicle 1020 only if the sensor 1016 also detects motion of the device 1010.

Some aspects of the present application relate to a remote keyless system, comprising a key fob comprising a passive radio. The passive radio is configured to transmit a signal in response to receiving an interrogation pulse from a car. The car comprises circuitry configured to verify the signal from the key fob and perform an operation in response to verifying the signal. In some embodiments, the key fob comprises a surface acoustic wave (SAW) resonator as part of the passive radio.

Some aspects of the present application relate to a method of remote keyless entry, the method comprising transmitting a ring-down signal, using a passive radio of a key fob, in response to receiving an interrogation pulse from a car. The method further comprises verifying the signal using circuitry of the car, and performing an operation using the circuitry of the car in response to verifying the signal.

Some aspects of the present application relate to a method of operating a remote keyless entry system. The method comprises performing a first digital challenge-response operation with an active radio in which a remote device receives a challenge and sends a response to a vehicle; and in response to successfully completing the challenge-response operation, performing a second analog challenge-response operation with a passive radio of the remote device.

In some embodiments, performing the second analog challenge-response operation comprises factoring a temperature of the passive radio into the analog challenge-response operation.

In some embodiments, performing the second analog challenge-response comprises evaluating, at the vehicle, a time and frequency of a response sent from the passive radio.

Some aspects relate to a key fob apparatus comprising a first passive radio configured to transmit a first signal in response to receiving a first interrogation pulse; and a second passive radio configured to transmit a second signal in response to receiving a second interrogation pulse.

Some aspects relate to a remote keyless system, comprising: a key fob comprising: a first passive radio configured to transmit a first signal in response to receiving a first interrogation pulse from a car; and a second passive radio configured to transmit a second signal in response to receiving a second interrogation pulse from the car, the car comprising circuitry configured to: unlock the car in response to verification of the first signal; and enable ignition of an engine of the car in response to verification of the second signal.

Some aspects relate to a method of remote keyless entry, the method comprising: transmitting a first signal, using a first passive radio of a key fob, in response to receiving a first interrogation pulse from a car; verifying the first signal using circuitry of the car; unlocking the car in response to verifying the first signal; transmitting a second signal, using a second passive radio of the key fob, in response to receiving a second interrogation pulse from the car; verifying the second signal using circuitry of the car; and enabling ignition of an engine of the car in response to verifying the second signal.

The various aspects of the present application may provide various benefits. Some examples are now listed. It should be appreciated that not all embodiments necessarily provide all benefits and benefits other than those listed may be provided. Aspects of the present application provide inexpensive and space efficient security measures for RKE systems. The use of SAW resonators in a passive radio may add little cost to existing RKE systems that use an active radio. Additionally, SAW resonators may be small, thus adding little size to existing RKE system key fobs or other remote entry devices. At the same time, the security of RKE systems may be enhanced, and in particular the difficulty of conducting a relay attack may be significantly increased.

According to some embodiments, a passive SAW resonator is provided in addition to an active RF Transceiver used in a key fob. In some embodiments, the resonator protocol exchange happens after regular RKE protocol exchange. In some embodiments, the SAW resonator response can be designed to be unique per OEM. In some embodiments, the SAW resonator may replace near field communication (NFC) when the key fob battery dies since it is completely passive. In some embodiments, separate out using the SAW resonator to unlock the vehicle doors from using it to start the engine. According to some embodiments, the SAW resonator's distance bounding properties may be particularly useful to an immobilize unit in the vehicle to check that the fob is in the car before allowing to start car engine. In some embodiments, the SAW resonator can be combined with an inertial sensor, such as an accelerometer, to detect motion (person walking towards car), which can be used to switch the state of the SAW resonator in its response.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. A remote keyless entry apparatus comprising:
   a housing;
   an active radio disposed within the housing and comprising powered circuitry configured to receive signals from and send signals to a vehicle; and
   a passive radio disposed within the housing and comprising passive circuitry, the passive radio configured to resonate and transmit a resonating ringdown signal to the vehicle in response to receiving an interrogation pulse of a specific frequency from the vehicle, the resonating ringdown signal having a predetermined decaying envelope with a characteristic expected by the vehicle.

2. The remote keyless entry apparatus of claim 1, wherein the remote keyless entry apparatus is a key fob, and wherein the housing is a key fob housing.

3. The remote keyless entry apparatus of claim 1, wherein the remote keyless entry apparatus is a smartphone, and wherein the housing is a smartphone housing.

4. The remote keyless entry apparatus of claim 1, wherein the passive radio comprises a surface acoustic wave (SAW) resonator.

5. The remote keyless entry apparatus of claim 4, wherein the passive circuitry of the passive radio is coupled to the SAW resonator and configured to program a resonance frequency of the SAW resonator to a first resonance frequency when the remote keyless entry apparatus is outside the vehicle and to a second resonance frequency when the remote keyless entry apparatus is inside the vehicle.

6. The remote keyless entry apparatus of claim 1, wherein the passive radio is a first passive radio comprising a SAW resonator having a first resonance frequency, the first passive radio being configured to transmit the resonating ringdown signal at a first frequency in response to receiving the interrogation pulse having a first pulse frequency from the vehicle, and wherein the remote keyless entry apparatus further comprises a second passive radio disposed within the housing and comprising a second SAW resonator having a second resonance frequency, the second passive radio being configured to transmit a resonating ringdown signal at a second frequency in response to receiving an interrogation pulse having a second pulse frequency from the vehicle.

7. The remote keyless entry apparatus of claim 1, further comprising an inertial sensor disposed within the housing and configured to sense motion of the housing, wherein the passive radio is configured to transmit the resonating ringdown signal to the vehicle in response to receiving the interrogation pulse from the vehicle only when the inertial sensor also senses motion of the housing.

8. The remote keyless entry apparatus of claim 1, wherein the interrogation pulse is an obfuscated signal.

9. A method of operating a remote keyless entry apparatus having a housing, an active radio disposed within the housing, and a passive radio disposed within the housing, the method comprising:
   receiving, with the passive radio, an interrogation pulse of a specific frequency from a vehicle; and
   in response to receiving the interrogation pulse, resonating and transmitting to the vehicle, using the passive radio, a resonating ringdown signal having a predetermined decaying envelope with a characteristic expected by the vehicle.

10. The method of claim 9, further comprising, prior to receiving the interrogation pulse with the passive radio, receiving a challenge signal from the vehicle with the active radio and transmitting to the vehicle a response to the challenge signal with the active radio.

11. The method of claim 9, wherein the passive radio comprises a surface acoustic wave (SAW) resonator and wherein the method comprises providing the interrogation pulse as an input signal to the SAW resonator and generating, with the SAW resonator, the resonating ringdown signal.

12. The method of claim 11, wherein the SAW resonator has a programmable resonance frequency, and wherein the method further comprising programming the resonance frequency of the SAW resonator to a first resonance frequency when the remote keyless entry apparatus is outside the vehicle and to a second resonance frequency when the remote keyless entry apparatus is inside the vehicle.

13. The method of claim 9, wherein receiving the interrogation pulse from the vehicle comprises receiving an interrogation pulse of a first frequency from the vehicle when the remote keyless entry apparatus is outside the vehicle and wherein transmitting the resonating ringdown signal comprises transmitting the resonating ringdown signal having a first frequency when the remote keyless entry apparatus is outside the vehicle, and wherein the method further comprises receiving an interrogation pulse of a second frequency from the vehicle when the remote keyless entry apparatus is inside the vehicle and transmitting a resonating ringdown signal having a second frequency when the remote keyless entry apparatus is inside the vehicle.

14. The method of claim 9, wherein the remote keyless entry apparatus further comprises an inertial sensor, and wherein the method further comprises detecting motion of the remote keyless entry apparatus using the inertial sensor, and wherein transmitting the resonating ringdown signal is performed only if the inertial sensor detects motion of the remote keyless entry apparatus.

15. The method of claim 9, wherein the resonating ringdown signal is modulated based on a current state of the passive radio.

16. A method of operating a vehicle transceiver, comprising:
   transmitting, with transmitter circuitry of the vehicle transceiver, an interrogation signal of a specific frequency to a remote keyless entry device;
   receiving, after transmitting the interrogation signal and using receiver circuitry of the vehicle transceiver, a ringdown response signal from a passive radio of the remote keyless entry device in response to the remote keyless entry device receiving the interrogation signal, the ringdown response signal having a predetermined decaying envelope with a characteristic expected by the vehicle transceiver; and
   processing the ringdown response signal to confirm authenticity of the remote keyless entry device.

17. The method of claim 16, further comprising transmitting a challenge signal and receiving a response to the challenge signal before transmitting the interrogation signal, wherein transmitting the interrogation signal is performed only if the response to the challenge signal is consistent with a target response.

18. The method of claim 17, further comprising determining a distance between the vehicle and the remote keyless entry device that generated the ringdown response signal and selecting a frequency of the interrogation signal based on the distance.

19. The method of claim 18, wherein selecting a frequency of the interrogation signal based on the distance comprises selecting a first frequency when the distance indicates that the remote keyless entry device is outside the vehicle and selecting a second frequency when the distance indicates that the remote keyless entry device is inside the vehicle.

20. The method of claim 16, further comprising updating a current state of the passive radio in response to confirming the authenticity of the ringdown response signal.

* * * * *